G. MÜLLER.
SOLDERING IRON.
APPLICATION FILED OCT. 20, 1915.
1,171,232.
Patented Feb. 8, 1916.
2 SHEETS—SHEET 1.
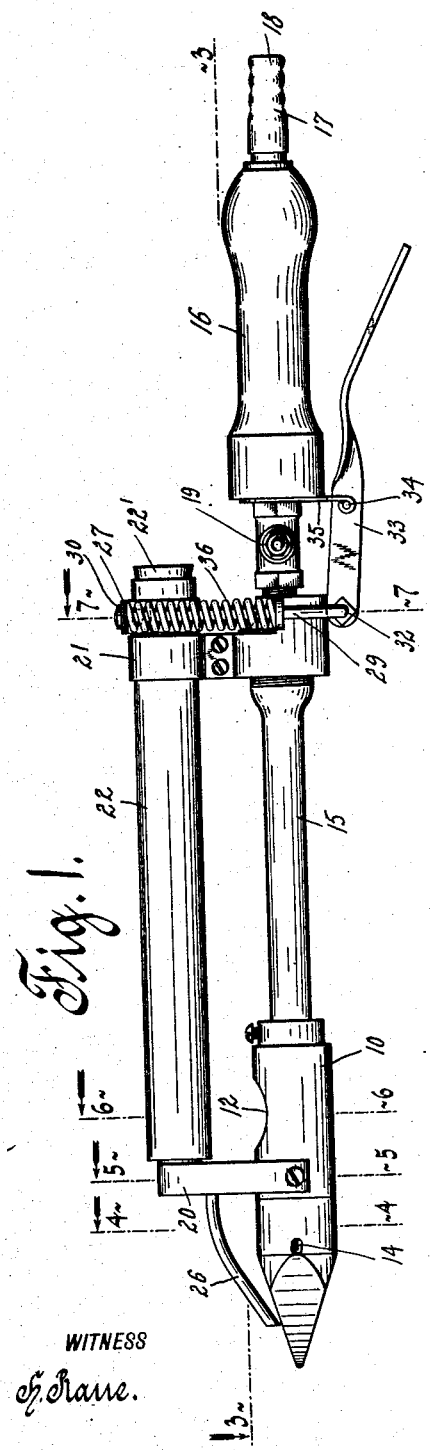

G. MÜLLER.
SOLDERING IRON.
APPLICATION FILED OCT. 20, 1915.
1,171,232.
Patented Feb. 8, 1916.
2 SHEETS—SHEET 2.
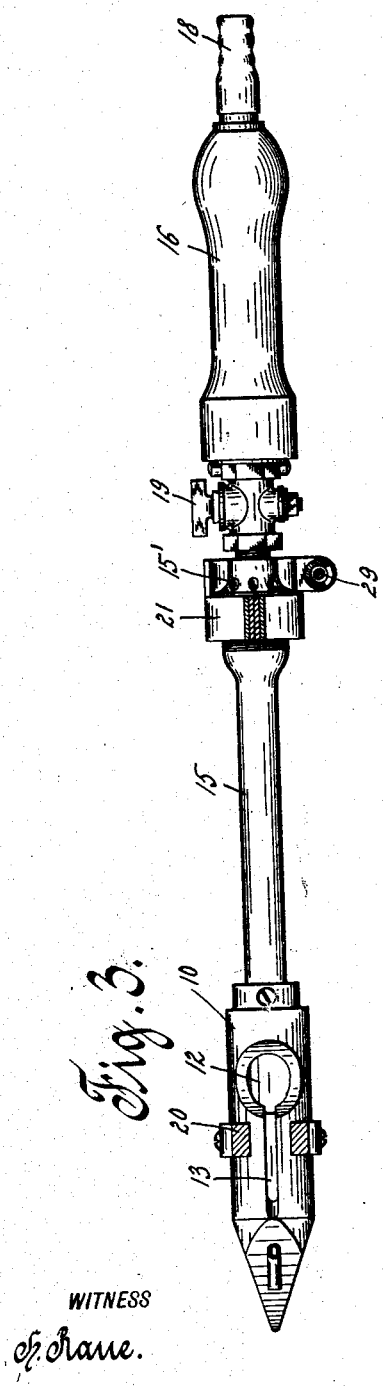
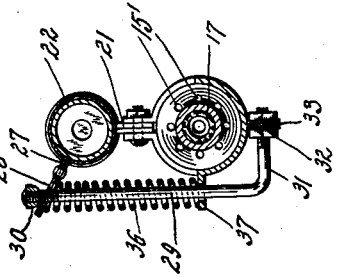
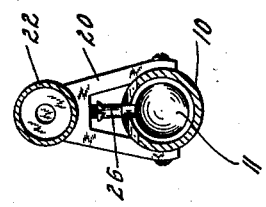
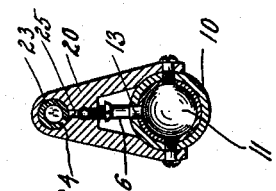
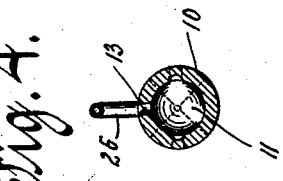

UNITED STATES PATENT OFFICE.

GÉZA MÜLLER, OF NEW YORK, N. Y.

SOLDERING-IRON.

1,171,232.   Specification of Letters Patent.   Patented Feb. 8, 1916.

Application filed October 20, 1915. Serial No. 56,885.

*To all whom it may concern:*

Be it known that I, GÉZA MÜLLER, a citizen of the United States, and a resident of the city of New York, in the county of New York and State of New York, have invented certain new and useful Improvements in Soldering-Irons, of which the following is a specification.

The present invention relates to soldering irons.

Tools of this type usually comprise a pointed or wedge-shaped bit, made of copper, an iron body or stock, and a wooden handle, and are used with a heated point for melting and applying solder. The bit is usually heated in a soldering furnace, that may be portable, if desired. In applying the solder in this way, much material goes to waste, it being almost impossible to predetermine or regulate the quantity that will be melted off the solder bar. On the other hand, the handling of the soldering furnace is often inconvenient and sometimes even dangerous, the latter depending, of course, upon the locality where such furnace is being used.

The main object of the present invention is to obviate these defects by providing the soldering iron with a self-contained heater or burner, in combination with a solder containing receptacle or magazine, said burner not only serving to heat the bit of the tool, but also to melt the solder in said receptacle or magazine.

Another object of the invention is to furnish a tool of this type, which is simple in construction, efficient in operation, and which can be manufactured on a commercial scale, or in other words one which is not so difficult to produce as to be beyond the reasonable cost of such a contrivance.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a front elevation of a soldering iron constructed in accordance with the present invention; Fig. 2 is a vertical longitudinal section taken therethrough; Fig. 3 is a section taken on line 3—3 of Fig. 1; Fig. 4 is a section taken on line 4—4 of Fig. 1; Fig. 5 is a section taken on line 5—5 of Fig. 1; Fig. 6 is a section taken on line 6—6 of Fig. 1; and Fig. 7 is a section taken on line 7—7 of Fig. 1.

In the drawings, the numeral 10 indicates the pointed bit of the tool. This bit may be made of any suitable material, for instance of copper, and is hollow, whereby a chamber 11 is formed. In the top portion of the bit is provided an opening 12, from which leads a longitudinal slot 13 toward the point thereof. The opening and slot, and also small side openings 14 extend through the wall of the bit. The bit is mounted upon a tubular stock 15, to which is fixedly attached a handle 16 of wood or similar material. Through this handle extends a gas pipe 17 to the stock, said pipe being provided with a nipple 18, to which a flexible tube, leading from a supply of gas, is adapted to be applied. The communication between the gas pipe 17 and the tubular stock is controlled by a cock 19, which, when in its open position, permits of a flow of gas from the pipe 17 through the tubular stock 15 into the chamber 11. In the rear end of the stock is provided a plurality of small apertures 15', through which air is drawn in by the gas, said air uniting with the gas and producing an extremely hot non-luminous flame, when the mixture of air and gas, escaping through the opening 12 and the slot 13, is being ignited.

To the bit and the rear end of the stock are rigidly attached upwardly extending brackets 20 and 21, respectively. In these brackets is oscillatably journaled a reservoir or magazine 22, that extends in parallel relation to the longitudinal axis of the tube. This reservoir may be of any suitable configuration, for instance cylindrical, its front end 23 being reduced in diameter, and in this reduced portion, which forms one of the journals thereof, is formed an outlet 24, that is adapted to register with a bore 25 in the bracket 20. From this bore leads a small tube or conduit 26 toward the point of the bit 11. The open rear end of the reservoir 22 is normally closed by a cover 22' of any suitable construction.

To the rear end of the reservoir is fixedly attached an arm 27, having a slot 28. Through this slot projects a bar 29, that is provided above the arm 27 with a head 30, and extends downward at the side of the reservoir and stock, its lower end 31 being bent toward the longitudinal axis of the stock and pivoted at 32 to a lever 33, the latter being fulcrumed at 34 to a bracket 35, that is carried by the handle of the tube. The free end of the lever is bent downward, and is adapted to be grasped by the hand holding the handle of the tool. A spring 36 is coiled upon the actuating bar 29, its upper end bearing against the arm 27 and its lower end against an extension 37 of the bracket 21.

The operation of this device is as follows: When the parts are in their normal positions, shown in the several figures of the drawings, the outlet 24 of the journal portion of the reservoir does not register with the bore 25 in the bracket 20. The reservoir is held in such position by the spring 36 above described. Solder is placed into the reservoir, the latter being closed by the cover 27, whereby the apparatus is ready for work. In starting the operation, the gas, issuing through the opening 12 and slot 13 in the bit of the tool, is ignited, the flame heating not only the bit, but also the forward portion of the reservoir and the small tube 26, the opening 12 and slot 13 being arranged below the elements mentioned. In this manner that portion of the solder which is disposed immediately below the flame will be melted and ready for use. In applying the solder, the downwardly bent rear end of the lever 33 is forced toward the handle of the tool, whereby the outlet of the reservoir is brought into registering position with the bore 25 in the bracket 20, the solder flowing thus through the said bore and the small tube 26 onto the point of the bit, and from there to the parts to be united, the bit being drawn in the usual manner along the line of union. The quantity of the solder flowing through the small tube 26 depends entirely upon the will of the operator, or in other words upon the time during which the communication between the reservoir and the small tube is kept open. When the lever 33 is released, the spring 36 returns the magazine to its normal closing position. The small openings 14 form flame outlets.

What I claim is:—

1. In a soldering iron, the combination with the bit, stock and handle of the tool, of a solder magazine oscillatably carried thereby, said magazine having an outlet, a conduit leading to said bit having an inlet adapted to register with said outlet, heating means for said bit and magazine, and manually controllable means for oscillating said magazine, whereby its outlet is brought in registering position with the inlet to said conduit.

2. In a soldering iron, the combination with the bit, stock and handle of the tool, of a solder magazine oscillatably carried thereby, said magazine having an outlet, a conduit leading to said bit having an inlet adapted to register with said outlet, heating means for said bit and magazine, manually controllable means for oscillating said magazine, whereby its outlet is brought in registering position with the inlet to said conduit, and means for returning said magazine to its normal closing position.

Signed at New York, in the county of New York, and State of New York, this 18th day of October, A. D. 1915.

GÉZA MÜLLER.

Copies of this patent may be obtained for five cents each, by addressing the "Commissioner of Patents, Washington, D. C."